Oct. 6, 1953 J. G. BLACK 2,654,651

REMOTE RADIO RECEIVER TUNING INDICATING APPARATUS

Filed Oct. 29, 1945

3 Sheets-Sheet 1

Inventor:
James G. Black
By Williams, Bradbury & Hinkle
Attorneys.

Inventor:
James G. Black
By Williams, Bradbury & Hinkle
Attorneys.

Oct. 6, 1953 J. G. BLACK 2,654,651

REMOTE RADIO RECEIVER TUNING INDICATING APPARATUS

Filed Oct. 29, 1945

3 Sheets-Sheet 3

Inventor:
James G. Black
By Williams, Bradbury & Hinkle
Attorneys.

Patented Oct. 6, 1953

2,654,651

UNITED STATES PATENT OFFICE 2,654,651

REMOTE RADIO RECEIVER TUNING INDICATING APPARATUS

James G. Black, Chicago, Ill., assignor to A. C. Nielsen Company, Chicago, Ill., a corporation of Illinois Application October 29, 1945, Serial No. 625,371

9 Claims. (Cl. 346—37)

The present invention relates to remote radio receiver tuning indicating apparatus and has for its primary object the provision of new and improved apparatus of the aforesaid character.

Another object of the present invention is the provision of new and improved apparatus for indicating at a remote point, which may be a central indicating or recording station, the tuning of a radio receiver located at a point distant from the recording station, as in the home of the owner of the receiver.

A further object of the present invention is to provide new and improved radio receiver tuning indicating apparatus including means for accurately indicating the tuning of a radio receiver, which means is operatively connected to the radio receiver through a suitable line, such as a telephone line.

A further object of the present invention is the provision of a new and improved remote radio receiver tuning indicating apparatus comprising a balanced circuit including a telephone line or the like and variable impedance means associated with the radio receiver whose tuning is to be indicated and which unbalances the circuit when the tuning is changed and other variable impedance means located at a central station which is operated to rebalance the circuit.

A further object of the present invention is to provide a new and improved apparatus of the character set forth in the preceding paragraph including motor operated variable resistors associated both with the radio receiver and with the central station apparatus.

A further object of the present invention is to provide a new and improved tuning indicating apparatus including a balanced circuit and means for substantially unbalancing the circuit when the tuning is varied thereby to effect operation of the indicating means over a considerable range each time the tuning is changed to provide greater accuracy.

A further object of the present invention is to provide a new and improved radio receiver tuning indicating apparatus including an indicator member moved to different positions by a motor and means for dynamically stopping the motor, thereby to insure greater accuracy of indications.

Another object of the present invention is the porvision of a new and improved means for dynamically stopping a motor, and more specifically, a means including a normally charged capacitor dischargeable through a motor winding for quickly and effectively stopping the motor.

A further object of the present invention is to provide radio receiver tuning indicating apparatus including new and improved means for indicating when the receiver is turned off and also when the indicating means is disconnected from the receiver, as by an open circuit in the telephone line, and further, including means for signalling the two above mentioned conditions.

Another object of the present invention is the provision of new and improved radio receiver tuning indicating apparatus including means for indicating the station to which the receiver is tuned and also the network to which the station is connected.

A further object is the provision of new and improved readily changed visual indicating means especially suited for indicating the network to which a radio receiver is tuned.

Other objects and advantages of the present invention will become apparent from the ensuing description of an embodiment of the invention in which reference is had to the accompanying drawing, in which.

Figure 1:
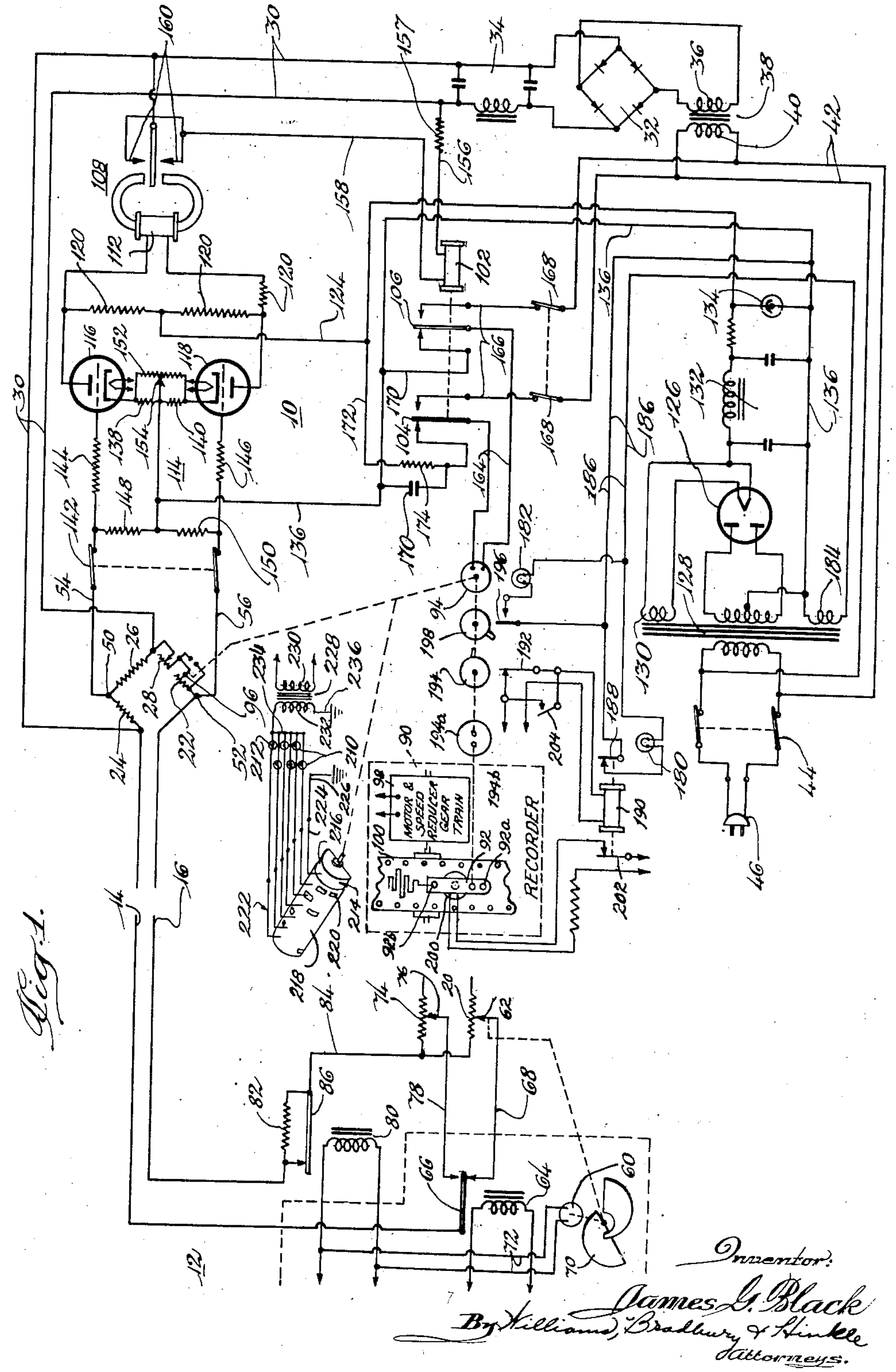
Fig. 1 is a schematic representation of one embodiment of the invention.

In brief, the present invention has for its primary purpose the indication or recording, or both, at a central station the various broadcast stations to which a radio receiver located in the home of the radio owner is tuned. It comprises a balanced circuit extending between the home and station, which circuit preferably includes a telephone line between the two locations. The balance of the circuit is changed when the tuning of a radio receiver is changed and the unbalance results in the operation of indicating or recording means at the station to a point corresponding to the newly selected station by means which restores the balance of the circuit.

The apparatus of the present invention comprises, in the main, two units, the first of which is indicated by reference character 10 and is located at the central point or station and a second unit, indicated by the reference character 12, which is coupled to a radio receiver. The two units are coupled to each other preferably through a telephone circuit including the conductors 14 and 16. The units may be permanently coupled or may be coupled at desired or selected times through a telephone exchange, not shown.

While the figure illustrates apparatus for indicating or recording the tuning of a single receiver, it should be understood that the tuning of any number of receivers may be recorded by similar apparatus for each of the receivers whose operation is to be indicated or recorded.

The coupling between the units 10 and 12 is effected primarily through a balanced circuit including the telephone lines 14 and 16. The balanced circuit is preferably of the bridge type and preferably includes continuously variable impedance means, such as resistors 20 and 22, associated with the radio receiver and indicating or recording apparatus, respectively. The value of resistor 20 is controlled in response to the tuning of the radio receiver and changes in tuning effects changes the value of the resistor to unbalance the circuit. The circuit balance is restored by adjustment of resistor 22, the value of which and the position of the adjusting means of which are thus indicative of the radio station to which the receiver is tuned. The resistors may be of the rotary type and have resistances of about 10,000 ohms. Resistor 22 also has an open circuit position for a purpose which will appear hereafter.

The bridge circuit includes in addition to the telephone line and resistors 20 and 22, a pair of fixed resistors 24 and 26 and an adjustable line balancer resistor 28 connected in series with resistor 22. Resistors 22—28, 24 and 26 constitute three legs of the bridge and the fourth leg includes the resistor 20 associated with the radio receiver. Resistors 24, 26, and 28 may also have values of about 10,000 ohms.

The bridge circuit is energized with direct current supplied to it through a pair of conductors 30 connected to a suitable source of direct current, which source may include a dry disc type rectifier 32 and a filter 34. The rectifier is connected to the secondary winding 36 of a transformer 38, the primary winding 40 of which is connected to a pair of conductors 42 leading to a suitable source of alternating current, as through a power switch 44 and a plug type connector 46.

The bridge circuit has its output terminals 50 and 52 connected to indicating and recording means and to power means controlling the variable resistor 22 in a manner to be described in greater detail shortly through conductors 54 and 56.

The valve of the variable resistor 20 associated with the receiver is varied in response to the tuning of the receiver and unbalances the bridge circuit when the tuning is changed. It is preferred that its value be varied by a slow speed (such as 1 R. P. M.) unidirectional motor 60 mechanically connected to a movable resistor contact 62. The motor may comprise a part of an electronic device coupled to a radio receiver and operable to positions indicative of the tuning of the radio receiver and thus to the various broadcast stations to which the receiver is tuned. This electronic device may be of the type disclosed and claimed in the copending application of Robert A. Clark, Jr., Application Serial No. 511,246, filed November 22, 1943, now Patent No. 2,483,573, and assigned to the assignee of this application. The electronic device is not illustrated nor will it be described in detail. It is believed sufficient to say that it includes a relay 64 which is adapted to be energized whenever the radio receiver is turned on. This relay is utilized to operate a movable switch blade 66 to connect the resistor 20 to the bridge circuit when the relay is operated. When operated, switch blade 66 interconnects telephone line 14 and a conductor 68 leading to the movable contact 62 associated with resistor 20.

The electronic device also includes the previously referred to motor 60 mechanically connected to a variable capacitor 70 forming part of the electronic control. The motor is so controlled that it is energized, when the tuning of the receiver is changed, to operate the capacitor 70 to a point corresponding to the station to which the receiver is tuned. When this point is reached, the motor is deenergized and stopped. It will thus be apparent that the value of resistor 20 is indicative of the station to which the receiver is tuned. The motor 60 is supplied with power through a pair of conductors 72 under the control of the electronic control device.

The unit 12 of the present invention associated with the receiver also includes means for unbalancing the bridge to a predetermined and unique extent to provide an indication of the operativeness of the radio receiver, thereby to provide an indication of the "on" and "off" periods of the receiver. This means includes an adjustable resistor 74, the value of which is preadjusted by means of a movable contact 76 and which is substituted in the bridge circuit for resistor 20 when the radio receiver is turned off. The substitution is effected by the relay 64, the switch blade 66 of which connects telephone line 14 to the resistor through conductor 78 when the radio is turned off and the relay 64 is deenergized. The relay 64 may remain energized for a brief period after the receiver is turned off because of a delay in the cooling of a cathode of a rectifier tube, provided a tube using an indirectly heated cathode is used, as is used in the disclosure of said application. As a result the motor operates for a brief period when the receiver is turned off, and varying resistor 20—but this is not a disadvantage because of the substitution of the "off" resistor 74 when the relay is deenergized. Rather, the delay is an advantage because when the receiver is subsequently turned on the motor operates and changes capacitor 70 and resistor 20 to return these to values and positions corresponding to the station tuned before the set was turned off. The resistor 74 may have a value of about 10,000 ohms, of which about 6,000 ohms are used.

In order to increase the accuracy of the apparatus, means are provided for insuring that the indicating means is operated to a substantial extent each time the tuning of the receiver is varied. This means substantially unbalances the bridge circuit each time the tuning is varied. It includes a relay 80 connected in parallel with the motor 60 and therefore energized each time the motor is energized, i. e., each time the tuning of the receiver is varied, and a circuit unbalancing resistor 82 placed in the bridge circuit by the relay when it is energized. The resistor 82 is connected to telephone line 16 and to a conductor 84 leading to the common ends of the resistors 20 and 74. When the tuning is changed and the motor 60 energized, the resistor 82 is placed in circuit by operation of switch blade 86 of relay 80, which removes a short circuit from across the resistor. When the short circuit is thus removed, the resistor 82 is placed in series with the resistor 20 to unbalance the bridge circuit and to effect operation of the indicating means over a considerable range. The resistor 82 may have a value of about 30,000 ohms.

The indicating or recording station unit 10 includes means for indicating and preferably recording the station to which the radio receiver is tuned. This means includes a tape type recorder 90 having a movable indicator-scriber 92 operated into different positions corresponding to the tuning of the radio receiver by a unidirectional alternating current motor 94 placed into operation when the circuit is unbalanced and which is also mechanically connected to the movable contact 96 of the variable resistor 22 to correlate the position of the scriber 92 with the position and value of resistor 22 and thus to the tuning of the radio receiver.

The tape type recorder 90 may be of various types and has therefore not been illustrated in detail. It may, however, include an electrical and spring type drive and speed reducing unit 98 for driving the tape 100 at a constant speed. More specifically, the stylus arm 92 is mounted for universal movement at its end 92*a* and is adapted to be moved to bring its stylus 92*b* thereof into engagement with the tape 100 in response to energization of a magnet 200. Movement of the stylus 92*b* transversely of the tape 100 to positions corresponding to stations to which the receiver 12 is tuned is effected by crank connecting the stylus arm 92 by means of a crank 194*b* to a crank wheel 194*a* mounted for rotation with the drive shaft of the motor 94.

The motor 94 is placed into operation to move the scriber 92 and to adjust resistor 22 whenever the bridge circuit is unbalanced. This control is effected through a motor circuit controlling relay 102 including a pair of switch blades 104 and 106, and a relay 108, preferably of the polarized type and including a movable switch blade 110, and the energization of which is controlled in response to the unbalance of the bridge. The relay 108 includes a winding 112 which is energized whenever the bridge circuit is unbalanced in either direction.

In order to increase the sensitivity of the apparatus, the bridge circuit is coupled to the relay 108 though an amplifier indicated as a whole by reference character 114 and including a pair of electron tubes 116 and 118. The tubes are preferably of the 6 J-6 type and they are connected in differential relationship to the bridge circuit and to a relay winding 112 (having an impedance of about 6,000 ohms), which is connected across the anodes of the two tubes through a resistor 120 (having a value of about 5,000 ohms). Suitable anode potential is applied to the anodes of the two tubes through resistors 120 and 122 (each of about 6,500 ohms), the common junction of which is connected to an anode voltage supplying conductor 124.

The anode potential is preferably supplied by rectifying means of the electronic type including a tube 126 (as of the 80 type) energized through a transformer 128. The filament of the tube is supplied with power from a low voltage secondary winding 130 of the transformer. The direct current output of the rectifier is supplied to the conductor 124 through a filter circuit 132 and a voltage regulator tube 134, which may be of the VR-150 type. The negative side of the direct current voltage is connected by conductor 136 to the cathodes of the amplifier tubes 116 and 118 through the cathode bias resistors 138 and 140, respectively (each of about 170 ohms).

The control grids of the tubes 116 and 118 are connected to the output terminals 50 and 52 of the bridge circuit through a normally closed test switch 142, the conductors 54 and 56 and resistors 144 and 146, respectively (each of about .1 megohm). The grid circuits are connected to the negative line 136 through resistors 148 and 150, respectively (each of about 5,000 ohms).

When the bridge circuit is balanced, no current flows through the winding 112 of the polarized relay 108—a condition that is obtained through the use of adjusting means including a resistor 152 (of about 500 ohms) connected across resistors 138 and 140 and an adjustable contact 154 connecting the resistor 152 to the junction of resistors 138 and 140. The adjustment is made with the test switch 142 open, which brings about a condition corresponding to a balanced condition of the bridge when the terminals 50 and 52 are at the same potential.

When the bridge is unbalanced, current flows in one direction or the other through the winding 112 with the result that the relay contact 110 is moved from a normal circuit opening position to a circuit closing position to energize the winding of the relay 102. This energizing circuit extends from one of conductors 30 to the other through conductor 156, which may have a voltage reducing resistor 157 interposed therein, the relay winding, conductor 158, one or the other of the two contacts 160 associated with the movable contact 110, the movable contact itself, and conductor 162.

When the winding of relay 102 is thus energized in response to the unbalance of the bridge circuit, the switch blades 104 and 106 are operated from a dynamic stopping position, which will be described in greater detail shortly, to a position to connect the motor 94 to a source of voltage, which source is preferably the 110 volt supply. The energizing circuit for the motor extends through the pair of conductors 164, the switch blades 104 and 106, the pair of conductors 166, a normally closed manually operable motor switch 168 and the previously referred to conductors 42 leading to the plug type connector 46. When this circuit is closed, the motor 94 is energized and operates to adjust resistor 22 to restore the balance of the bridge circuit and to move the scriber 92 to a position corresponding to the position of contact 96 and the value of resistor 22.

When the bridge circuit has been balanced then, in accordance with one of the features of my invention, the motor 94 is disconnected from its alternating current source power supply and quickly and effectively dynamically stopped by supplying it with a pulse of current and then held in stopped position by a connection to a relatively low direct current voltage supply means. The motor is disconnected from the alternating current source by the deenergization of relays 108 and 102. Deenergization of relay 102 results in the movement of switch blades 104 and 106 to disconnect the motor from its alternating current source and to connect the motor to the current pulse supplying means, which is preferably a capacitor 170. This capacitor is charged to a relatively high direct current potential when the motor 94 is in operation, it then being connected to the output of the rectifier and filter through conductors 136, 172 and resistor 174 (of about 10,000 ohms). The capacitor may have a value of about 64 mf. and it, as already indicated, supplies a pulse of current quickly and effectively to stop the motor when the circuit has been rebalanced. The motor is maintained in its stopped position by a relatively low direct current, the motor being connected across the conductors 136 and 172 through the resistor 174.

The arrangement of the bridge circuit and variable resistors and the resistance value of the encircuited portion of the resistor 74 are such that when the "off" resistor 74 is switched into the bridge circuit, the circuit becomes balanced only when the scriber 92 is moved to its extreme left position, thereby to provide an indication that the receiver has been turned off. An indication that the telephone line is open, which is particularly desirable in the event the connection is made through a telephone exchange, is given by the location of the scriber 92 at its extreme right position. In the latter case the motor 94 operates the contact 96 of resistor 22 to an open circuit position.

Additional indications of the on and open circuit conditions are given by lamps 180 and 182, respectively. When the radio is turned on, the lamp 180 is supplied with power, and under open circuit conditions, the lamp 182 is supplied with power.

When the radio is turned on, the lamp 182 is connected to a low voltage secondary winding 184 of transformer 128 through conductors 186, the connection being effected by the closure of switch 188 operable by a relay winding 190. The winding 190 is energized when the radio is turned on by the closure of a power circuit by a switch 192 controlled by a cam 194 in such manner that the switch is closed except when the radio is in its off position. In the off position, the switch is opened by the cam, which is rotated to the off position by the motor 94 under the control of the bridge circuit. Power is supplied to the relay winding 190 from a suitable source, such as the 110 volt supply lines 42.

The open line condition is indicated by the illumination of lamp 182, which is connected across the power lines 186 by a switch blade 196 controlled by a cam 198 under the open circuit condition. The cam and switch are so constructed and arranged that the switch blade 196 closes an energizing circuit for the lamp when the motor 94 is stopped in its off position.

If desired, the scriber 92 may be so constructed and arranged that it is biased away from the record tape and is moved into contact with the tape whenever the radio receiver is turned on. The scriber may be moved into contact with the tape by a solenoid 200 which is supplied with power when the radio is turned on through a switch 202 closed by the relay winding 190 when the latter is energized. Power is supplied to solenoid 200 from a suitable source, such as the direct current lines 30.

If the solenoid 200 is used, then the scriber is moved out of contact with the tape in the off position. However, the angular position of the scriber still indicates that the radio has been turned off.

The use of the off resistor 74 and the scriber in contact with the tape in the off position, enables variations in telephone circuit resistance to be checked. If the scriber solenoid 200 is used, then in order that the line resistance variation can be checked, there is provided a manually closable switch 204 which, when closed, energizes the relay 190 independently of the cam controlled switch 192.

In accordance with another feature of the present invention, the apparatus is provided with means for visually indicating the network to which the radio station is connected. This means includes a plurality of network indicating lamps 210, in this case five, for indicating five networks and a lamp 212 for indicating stations other than said five or more network stations. The illumination of the lamps is controlled by a drum type controller indicated as a whole by reference character 214, the angular position of which corresponds to the tuning of the radio receiver, and which is angularly movable by the motor 94. This controller forms an important part of my invention, as it, in effect, produces control impulses in a simple and effective way, which can be used for energizing lights or performing other desired functions.

The drum controller controls, in the embodiment of the invention illustrated, the supply of power to the lamps. It includes a drum having an outer shell 216 of conducting material, upon which is mounted a card 218 of insulating material having a series of longitudinally and angularly spaced apart perforations 220 corresponding to the various stations. These perforations have angular lengths corresponding to the calibrated band widths of the stations to which they correspond, as will be described in greater detail shortly in conjunction with Figs. 2 to 5, inclusive.

The drum controller includes also a series of brushes 222 for each of the lamps, and a single brush 224 connected to ground (or a common conductor) through conductor 226.

Power is supplied to the network indicating means through a transformer 228 having its primary winding 230 connected to a suitable source of power, such as the conductors 42. The low voltage secondary winding 232 of the transformer is connected to a conductor 234 common to the individual lamps and to a ground connection 236.

Figures 2, 3:
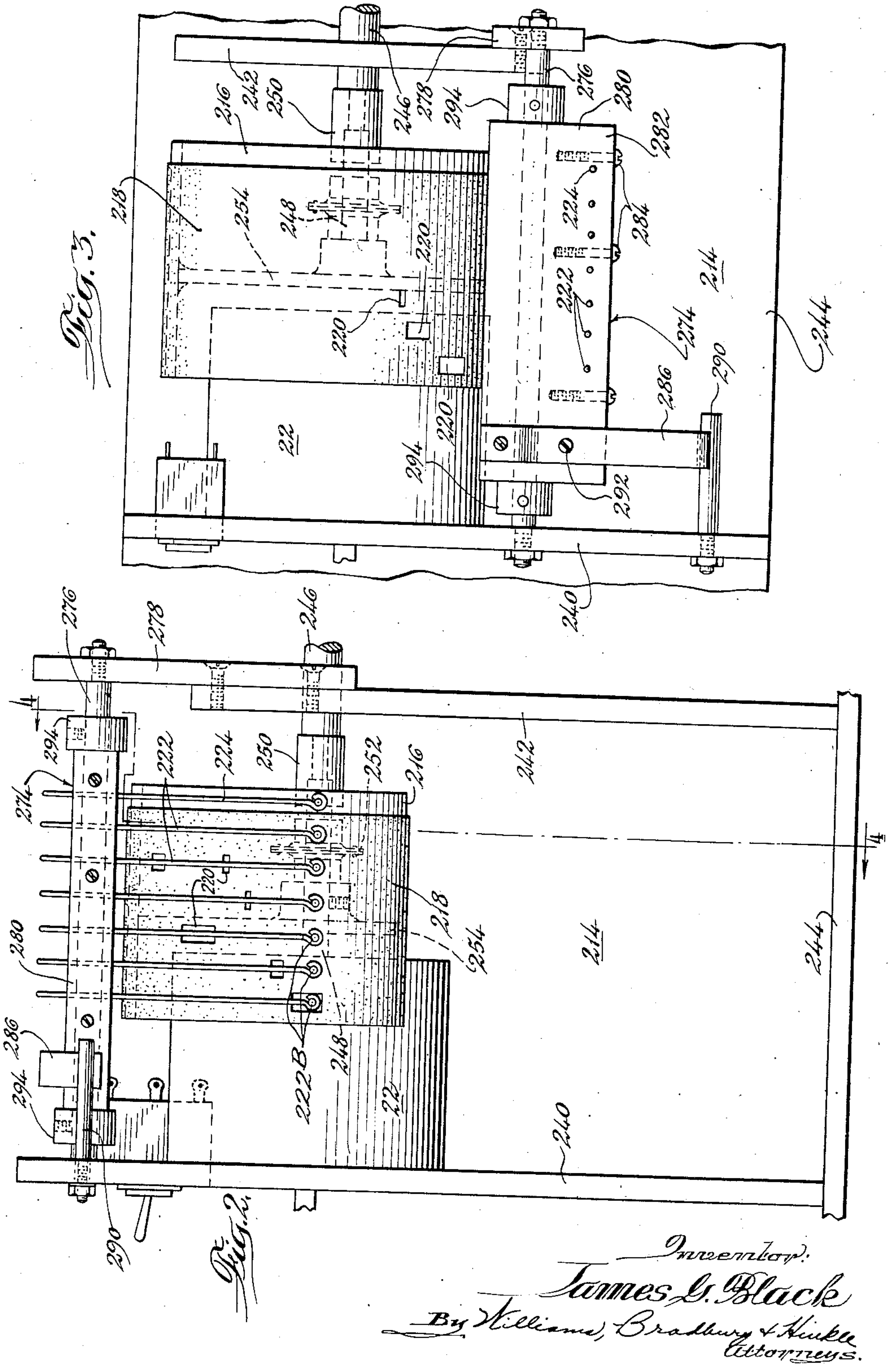
Fig. 2 is a side elevational view of a visual indicator control mechanism utilized in the invention and which is only diagrammatically illustrated in Fig. 1.
Fig. 3 is a fragmentary plan view of the mechanism.

The controller 214 controlling the energization of the lamps will now be described with particular reference to Figs. 2 to 5, inclusive. It is preferably constructed as a unit with the adjustable resistor 22, which is shown in Figs. 2 and 3 as being supported by a vertical plate 240 which, together with a somewhat smaller plate 242, supports the controller. The supports 240 and 242 are mounted upon a base plate 244.

The controller is coupled to the motor 94 through a motor driven shaft 246. The shaft 246 is drivingly connected to a combined drum and potentiometer driving shaft 248 through a coupling sleeve 250 and a coupling 252.

The outer shell 216 of the drum controller is preferably made of suitable conducting material, such as brass tubing. The shell is not a complete tube, but rather is made with an arcuate extent somewhat greater than 180° so that the perforated card 218 may be readily and detachably secured to it, and because only a 180° portion of the potentiometer 22 is actually used. This portion of resistor 22 is preferably from 0 to about 6,000 ohms, corresponding to the used portion of resistor 20. The shell is suitably secured, as by soldering, to an inner support 254 which is attached to the shaft 248.

Figures 4, 5:
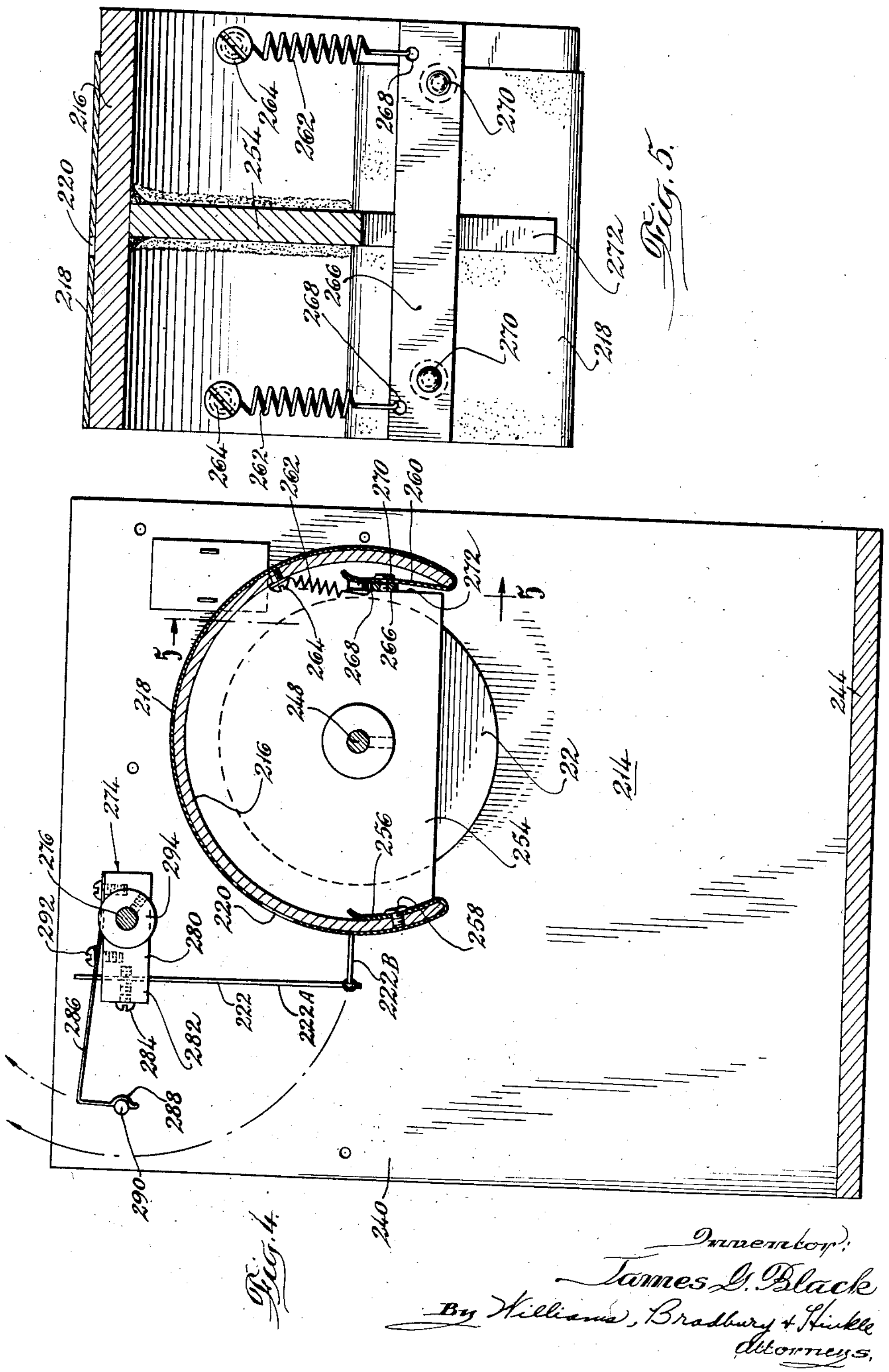
Fig. 4 is a fragmentary vertical cross-sectional view taken generally along the line 4—4 of Fig. 2.
Fig. 5 is an enlarged cross-sectional view taken along the line 5—5 of Fig. 4.

The card 218 is made of some suitable insulating material such as fiber paper or plastic. It is detachably secured to the drum shell 216 in such manner that it may be readily attached or detached. This is of importance, because the perforations 220 in the card must be calibrated with the radio receiver properly to indicate the station and the network with which the station is affiliated. One end 256 of the card is, referring now particularly to Fig. 4, bent around one end of the drum shell and secured to the inside of the shell by a pair of screws 258, only one of which is illustrated in Fig. 4. The other end 260 is bent around the opposite end of and attached to the inside of the shell by resilient means holding the card tightly against the outer surface of the shell. The resilient means includes a pair of springs 262 located near opposite axial ends of the shell and secured to the inside of the shell by small screws 264. The opposite ends of the springs are detachably attached to the end 260 of the card by a card holder bar 266, the bar being provided with apertures 268 near its opposite ends, enabling the bar easily to be hooked to the springs. The bar is secured to the card by a pair of spaced apart screws 270. The bar is guided and held against undesired displacement by a slot 272 in and located near the outer surface of the shell holding member 254.

The brushes 222 and 224 are mounted upon a brush holder indicated generally by reference character 274, movably supported above the shell in order that the brushes may be moved away from the shell as a unit when it is desired to have access to the drum for the purpose of changing cards or the like.

The brush holder 274 is movably supported on a supporting shaft 276 secured at its opposite ends to the supporting plates 240 and to an extension supporting plate 278 secured to the upper end of supporting plate 240.

The brushes are detachably secured to the brush holder by the two detachable parts 280 and 282 of the holder, between which the brushes 222 and 224 are securely held. Brush holder part 280 is movably mounted on the supporting shaft 276 and brush holder part 282 is secured to part 280 as by a plurality of screws 284.

The brushes 222 comprise relatively long contact arms 222A made of suitable material, such as Phosphor bronze spring wire, and brush wires 222B secured to the ends of the contact arms and resiliently bearing against the card 218 or the shell 216, as the case may be.

The contact arms and brushes are biased and held against the card and shell by suitable means, such as a snap spring 286, having one end secured to the brush holder and having its other end bent and provided with a semi-circular bend 288 adapted to fit about a stop pin 290, thereby to hold the brush assembly in position. The pressure with which the brushes are held against the card and shell by spring 286 is adjusted by a screw 292 which adjusts the position of the snap spring 286 relative to the brush holder.

The longitudinal position of the brushes is adjustable by the desired location of a pair of spacer collars 294 at opposite ends of the brush holder, and which are detachably secured to the supporting shaft 276.

In the description of the operation of the apparatus, it will be assumed that the radio receiver has been in operation and that the recording and indicating apparatus has been stopped in a position corresponding to the station to which the receiver is tuned and that the visual indicating means shows the network affiliation of the station. At this time the various switches and circuits are in the conditions illustrated in Fig. 1. The plug 46 is connected to a suitable source of alternating current voltage; the test switch 142 is closed as are the motor switch 168 and the power switch 44. The motor 94 is held stopped by the direct current flow through the motor winding, the flow occurring through switch blades 104 and 106 in their illustrated positions. The motor 60 associated with the radio receiver is deenergized, as is the relay 80. Resistor 82 is therefore short circuited by the switch 86 so that the resistor 20 is connected to the bridge circuit through the switch blade 66. Indicator 92 is in a position corresponding to the station tuned in and one of lamps 210 is illuminated.

Assuming now that the user of the radio tunes in another station, then the motor 60 and the relay 80 are energized. The former operates the tuning condenser 70 of the electronic control device and the movable contact 62 to vary resistor 20. The relay 80 opens its switch 86 thereby inserting resistor 82 into the bridge circuit in series with resistor 20. Thus even though the tuning means be operated but a slight distance, the bridge is unbalanced to a considerable extent insuring effective operation of the apparatus at the central recording station. The unbalance voltage of the bridge is applied to the grids of the vacuum tubes 116 and 118 with the result that current flows through the winding 112 of relay 108. The movable switch blade 110 of the relay closes a circuit to energize the winding of relay 102 and the latter operates switch blades 104 and 106 to disconnect the motor from the direct current source and to connect it to the source of alternating current, thereby causing the motor to rotate. The motor therefore operates to move the scriber 92, to adjust resistor 22 and to move the visual indicator controller 214.

The motor 60 continues to adjust resistor 20 until the condenser 70 has been moved to a position corresponding to the station tuned in, at which time the motor 60 is deenergized and stopped. The relay 80 is simultaneously deenergized. When the motor stops, the resistor 20 has been varied to a value corresponding to or indicative to a radio station to which the receiver is tuned, and it alone remains in the bridge circuit because the resistor 82 is short circuited upon return of switch blade 86 to its indicated position. The motor 94 continues now to operate until resistor 22 has been adjusted to a value balancing the resistor 20. When thus adjusted, the bridge output returns to zero and the relay 108 is deenergized. The latter effects the deenergization of relay 102, which disconnects the motor from the alternating current source and connects it to the pulse producing condenser 70 and to the direct current voltage source through resistor 17, thereby quickly to stop the motor and hold it stopped. When the motor stops, the scriber 92 also stops and in a position corresponding to the ratio station to which the receiver is tuned.

When the motor rotates, it also rotates the drum 216 of the visual indicating means and the drum is stopped at an angular position corresponding to the station tuned in. The network indicating lamp 210 corresponding to the station is illuminated through a circuit including the lamp, the corresponding brush 222, perforation 220 and the drum shell 216 and brush 224. The lamp indicates the network affiliation of the station tuned in as the perforation is aligned with the brush connected to the lamp indicating the network. Non-network stations are indicated by the illumination of lamp 212.

The controller drum and perforated card provide accurate indication of stations received close together on the frequency band because they usually are on different networks so that the perforations are axially displaced.

Only about one-half of the controller drum and resistors 20 and 22 are used because the stations tuned in on the receiver are recorded only when the scriber 92 is moved in one direction—thereby to avoid back lash. For the same reason, the motor 60 of the electronic control associated with receiver, which has a scriber associated with it (not shown) is only stopped for one direction of variation of condenser 70.

When the tuning of the radio receiver is again varied, the operation is repeated as heretofore described, with the result that the scriber 92 and drum controller 214 are again operated to new positions corresponding to the station tuned in and network affiliation of the station. A continuous and accurate indication and record are thus made of the stations to which the receiver is tuned and a visual indication is provided of the network.

When the radio receiver is turned off, the relay 64 is deenergized (with a brief time delay if the power source includes a rectifier tube having an indirectly heated cathode) and its switch 66 connects the off resistor 74 in the bridge circuit. The bridge circuit is thus unbalanced (and when the time delay type operation occurs, the bridge is unbalanced by operation of the motor 60 for a brief interval) and the motor 94 again energized to adjust resistor 22 until it balances the bridge for the effective value of resistor 74 in the bridge circuit. As heretofore indicated, this balance occurs when the scriber 92 is at the extreme left of the tape 100. In the off position, the light 180 is extinguished to give a visual indication. The light is extinguished by the opening of switch 192 by cam 194, and the subsequent opening of switch 188 upon deenergization of relay winding 190. At the same time solenoid 200 is deenergized and the scriber lifted from the tape—this providing a record of the off position.

When the receiver is turned on, the relay 64 is energized to disconnect resistor 74 from the bridge circuit and to connect resistor 20 to it. This unbalances the bridge circuit, as does the connection of resistor 82 to the bridge circuit by relay 80, which is energized along with motor 60 to hunt for the station tuned in by the receiver. The motor 94 is again energized because of the unbalance of the bridge circuit and it operates to adjust resistor 22, to move scriber 92 to indicate and record the tuning of the radio receiver to move the drum control visually to indicate the network.

In the event the telephone line is opened, for example inadvertently at a telephone exchange through which the line extends, the scriber 92 is operated to its extreme right position to indicate the open circuit condition. When the telephone line is opened, an infinite resistance is placed in one leg of the bridge with the result that the bridge is unbalanced and the motor 94 is energized to adjust resistor 22 until it is in an open circuit position, whereat the bridge is again balanced and the motor 94 stopped.

An indication of short wave reception is also provided. When the receiver is turned to short wave reception, the motor 60 operates continuously to vary the resistor 20. As a result the bridge circuit is continuously unbalanced and motor 94 continuously energized to oscillate the scriber 92 back and forth across the tape.

In order to ascertain if there has been a change in line resistance when the radio receiver is in its off position, the switch 204 may be closed so that the scriber will make a record. If the record is not at the normal "off" position, an indication of resistance variation is given and this may be compensated for by adjustment of line balancer resistor 28.

While but a single embodiment of the invention has been described in detail, it should be understood that these details are not intended to be limitative of the invention except insofar as set forth in the accompanying claims. Insofar as modifications of the invention are concerned, it should perhaps be noted that the resistor 20 may be varied by means other than that described. For instance, the variation could be effected by mechanically coupling the movable contact 62 directly to the tuning control of the receiver. Other arrangements and types of impedance means may also be used.

Having thus described my invention, what I claim as new and desire to secure by Letters Patent is:

1. Apparatus for indicating at a central station the tuning of a radio receiver positioned at a remote point from the central station, including in combination, indicating means including a movable member, a unidirectional motor operatively connected to said movable member for moving said member, a balanced bridge circuit adapted to be unbalanced by changes in tuning of the receiver and to be rebalanced by operation of said motor, said circuit comprising a variable resistor comprising one arm of the bridge circuit positioned at the remote point and variable in response to the tuning of the receiver to unbalance the circuit the other three arms of the bridge circuit being positioned at the central station, one of said three arms including a variable resistor variable by said motor to rebalance the circuit, balanced amplifying means differentially connected to the bridge circuit, and a relay connected to the output of said amplifying means and controlling the position of the motor in response to unbalances in the bridge circuit to move said movable member into different positions corresponding to the variations in the variable resistor positioned at the remote point due to the tuning of the receiver.

2. Apparatus for indicating at a central recording station the tuning of a radio receiver located at distant point, including in combination, indicating means at the central station including a movable member, a unidirectional alternating current motor at the central station operatively connected to said movable member for moving said member, a balanced bridge circuit extending from the distant point to the central station adapted to be unbalanced by changes in tuning of the receiver and to be rebalanced by operation of said motor, said circuit comprising a variable resistor in the bridge circuit variable in response to the tuning of the receiver to unbalance the circuit and a variable resistor in the bridge circuit variable by said motor to rebalance the circuit, balanced amplifying means differentially connected to the bridge circuit, a relay having a winding connected to the output of said amplifying means, a switch operable by said relay for connecting the motor to an alternating current source whenever the bridge circuit is unbalanced thereby to move said movable member into different positions corresponding to the tuning of the receiver, means operable by said switch when the motor is disconnected from the alternating current source for dynamically stopping the motor, two other resistors at the distant point, means operable in response to a change in tuning for connecting one of said other resistors in said balanced circuit temporarily when the tuning is changed thereby to effect operation of said indicating means by said motor each time the tuning is changed to provide greater accuracy, and means operable in response to the operative condition of the receiver for disconnecting said first mentioned variable resistor and connecting the second other resistor to said balanced circuit when the receiver is turned off.

3. Apparatus for indicating the tuning of a radio receiver, including in combination, indicating means including a movable member, power means operatively connected to said movable member for moving said member, means including a balanced circuit comprising circuit balance changing means operable in response to the tuning of the receiver and circuit balance changing means operated by said power means for controlling the operation of said power means, other balance changing means, and means for connecting said other balance changing means to said circuit only during the time the first mentioned balance changing means is operated.

4. Apparatus for indicating the tuning of a radio receiver, including in combination, indicating means including a movable member, power means operatively connected to said movable member for moving said member, means including a balanced circuit comprising first variable circuit balance changing means operable in response to the tuning of the receiver and second variable circuit balance changing means operated by said power means for controlling the operation of said power means, third balance changing means, means for connecting said third balance changing means to said circuit only during the time the first mentioned balance changing means is operated, fourth balance changing means, and means responsive to the operative condition of the receiver for connecting said first variable balance changing means in said balanced circuit when the receiver is operative and for connecting said fourth variable balance changing means in said balanced circuit when the receiver is out of operation.

5. Apparatus for indicating at a central station the tuning of a radio receiver positioned at a remote point from said central station, including in combination, indicating means including a movable member, power means including a unidirectional motor operatively connected to said movable member for moving said member, and means including a balanced circuit comprising circuit balance changing means positioned at the remote point and operative in response to tuning of the receiver and circuit balance changing means positioned at the central station and operated by said motor for controlling the operation of said motor to move said movable member to different positions corresponding to the tuning of the receiver, said second mentioned balance changing means including an open circuit position whereby an open circuit condition existing between the central station and the remote point may be indicated.

6. Apparatus for indicating at a central station the tuning of a radio receiver positioned at a remote point from said central station, including in combination, indicating means including a movable member, a unit operatively connected to said movable member for moving said member, means including a balanced circuit comprising circuit balance changing means positioned at the remote point and operable in response to tuning of the receiver and circuit balance changing means positioned at the central station and operated by said motor for controlling the operation of said motor to move said movable member to different positions corresponding to the tuning of the receiver, said second mentioned balance changing means including an open circuit position whereby an open circuit condition existing between the central station and the remote point may be indicated, and means associated with said motor for visually indicating said open circuit condition.

7. Apparatus for recording at a central station the tuning of a receiver positioned at some distance therefrom upon a movable tape or the like, including in combination, a recording member mounted for movement to engage and be disengaged from the tape, means operable in response to placing of the receiver in operation for effecting movement of the said member to engage the tape in order to provide a record of the operation of said receiver, a circuit interconnecting said central station and said remote point, and means operable independently of said last mentioned means for effecting movement of said member to engage the tape, the operation of said last mentioned means causing the movement of the recording member for a distance which is dependent upon variations in said circuit impedance so as to provide an indication of said variation.

8. Apparatus for recording at a central station the tuning of a receiver positioned at some distance therefrom upon a movable tape or the like, including in combination, a recording member mounted for movement to engage and be disengaged from the tape, means including a solenoid energizable in response to placing the receiver in operation for effecting movement of the said member to engage the tape in order to provide a record of the operation of said receiver, a signal line interconnecting said central station and said remote point, and means operable independently of said last mentioned means for energizing said solenoid for effecting movement of said member to engage the tape, the operation of said last mentioned means causing the movement of the recording member for a distance which is dependent upon variations in the resistance of said signal line so as to provide an indication of said variations.

9. Apparatus for recording at a central station the tuning of a receiver located remote from the apparatus upon a movable tape or the like, including in combination, a recording member mounted for movement to engage and be disengaged from the tape and for transverse movement along said tape to record data, means including a circuit coupling the apparatus to the receiver, a cam switch, a solenoid, means including said cam switch for energizing said solenoid in response to placing the radio in operation for effecting movement of the said member to engage the tape in order to provide a record of the operation of said receiver, a signal line interconnecting said central station and the remote location, means including a manually operable switch for energizing said solenoid independently of said cam switch for effecting movement of said member to engage the tape, and means for moving the recording member transversely of the tape upon the operation of said independently operated means for a distance which is dependent upon variations in the resistance of said signal line so as to provide an indication of said variations.

JAMES G. BLACK.

References Cited in the file of this patent

UNITED STATES PATENTS

| Number | Name | Date |
|---|---|---|
| 502,399 | Haskins | Aug. 1, 1893 |
| 1,039,724 | Gallaher | Oct. 1, 1912 |
| 1,523,345 | Modsen | Jan. 13, 1925 |
| 1,939,443 | Geiselman | Dec. 12, 1933 |
| 1,942,587 | Whitman | Jan. 9, 1934 |
| 1,960,350 | Shackletord et al. | May 29, 1934 |
| 1,970,442 | Wittknhns | Aug. 14, 1934 |
| 1,995,594 | Wunsch | Mar. 26, 1935 |
| 2,113,436 | Williams | Apr. 5, 1938 |

| Number | Name | Date |
|---|---|---|
| 2,119,205 | Doyle et al. | May 31, 1938 |
| 2,141,056 | Watkins | Dec. 20, 1938 |
| 2,175,937 | Elder et al. | Oct. 10, 1939 |
| 2,279,232 | Graham | Apr. 7, 1942 |
| 2,282,480 | Keller | May 12, 1942 |
| 2,305,834 | Woodruff | Dec. 22, 1942 |
| 2,375,820 | Ridings et al. | May 14, 1945 |
| 2,393,960 | Allen | Feb. 5, 1946 |
| 2,397,562 | Potter | Apr. 2, 1946 |
| 2,434,919 | Girard | Jan. 27, 1948 |
| 2,439,201 | Clark, Jr. | Apr. 6, 1948 |
| 2,525,541 | Grepe | Oct. 10, 1950 |
| 2,529,490 | Field | Nov. 14, 1950 |
| 2,544,919 | Dueringer | Mar. 13, 1951 |

FOREIGN PATENTS

| Number | Country | Date |
|---|---|---|
| 619,496 | France | Apr. 2, 1927 |